United States Patent [19]

Valgin et al.

[11] 4,211,856

[45] Jul. 8, 1980

[54] PROCESS FOR PRODUCING ACID AGENT FROM SULFONATED PHENOL AND FORMALDEHYDE

[76] Inventors: Vasily D. Valgin, ulitsa Truda, 18, kv. 4; Alexandr M. Vasilenko, ulitsa Usti na Labe, 2, kv. 15, both of Vladimir; Anatoly Y. Morozov, ulitsa Geroev Pionerov, 11, kv. 6; Vadim D. Chesnokov, ulitsa K. Marxa, 50, kv. 28, both of Rostovskaya oblast, Kamensk-Shakhtinsky, all of U.S.S.R.

[21] Appl. No.: 867,173

[22] Filed: Jan. 5, 1978

[51] Int. Cl.² ............................................... C08G 8/18
[52] U.S. Cl. ..................................... 528/141; 528/137; 528/146; 528/150; 528/158; 528/164; 525/480; 525/504
[58] Field of Search ............... 528/150, 130, 132, 141, 528/146, 158, 164, 137

[56] References Cited

U.S. PATENT DOCUMENTS

| | | | |
|---|---|---|---|
| 1,237,405 | 8/1917 | Stiasny | 528/150 |
| 1,951,564 | 3/1934 | Somerville et al. | 528/150 |
| 3,852,374 | 12/1974 | Erdmann et al. | 528/150 |

*Primary Examiner*—Lester L. Lee
*Attorney, Agent, or Firm*—Haseltine, Lake & Waters

[57] ABSTRACT

A process for producing an acid agent which comprises reaction of sulphonated phenol and formaldehyde in an "ideal" displacement reactor at a temperature within the range of from 50° to 120° C. at a constant molar ratio of said components. The reaction may be carried out in the presence of additives such as urea or orthophosphoric acid.

The process according to the present invention has an increased productivity at reduced power and labor inputs as compared to the prior art processes.

4 Claims, No Drawings

PROCESS FOR PRODUCING ACID AGENT FROM SULFONATED PHENOL AND FORMALDEHYDE

FIELD OF THE INVENTION

The present invention relates to the art of synthetic oligomers and, more specifically, to a process for producing an acid agent which is useful as a catalyst for curing phenol-formaldehyde resole and as a synthetic tanning agent in leather manufacture.

BACKGROUND OF THE INVENTION

Known in the art is a process for producing an acid agent which comprises condensation of phenol with an aldehyde at a temperature within the range of from 85° to 100° C. for a period of several hours, followed by sulphonation of the resulting novolac with sulphuric acid at a temperature of 100°–110° C. for 2–6 hours (cf. British Pat. Nos. 1,361,045; 1,359,683).

This prior art process has a disadvantage residing in intermittent character of the process, long duration of the technological cycle, considerable power input and labour consumption.

The resulting acid agent also has disadvantages such as a high viscosity of the sulphonated novolac, presence of sulphuric acid, sometimes in substantial amounts, therein; a low content of phenol rings, unsubstituted with sulphoxy group, capable of performing the function of an active acceptor of formaldehyde. To lower the viscosity, such as acid agent should be diluted with water which increases its corrosion activity.

Known in the art is a process for producing an acid agent which is carried out in a batch reactor in two stages: at the first stage phenol is reacted with sulphuric acid at a temperature of from 125° to 150° C. for a period of 0.5 to 1.0 hour; at the second stage the product resulting from the first stage is reacted with formaldehyde at a temperature within the range of from 30° to 50° C. for 1–2 hours (cf. British Pat. No. 1,283,113).

This prior art process has disadvantages residing in a intermittent character thereof, substantial power consumption assotiated with the necessity of intensive stirring.

The acid agent produced by this process is a relatively weak acceptor of the aldehyde liberated upon curing of a phenol-aldehyde resole and imparts an increased corrosive activity to the phenol-aldehyde resins cured thereby.

Also known in the art is a process for producing a phenol-aldehyde formed plastic with the use of an acid agent as a catalyst which comprises a condensation product of sulphonated phenol, a nitrogen-containing organic compound pertaining to the class of amines or amides, and formaldehyde.

Said acid agent is prepared by the process involving reaction of sulphuric acid, phenol, the nitrogen-containing compound and the aldehyde in a batch reactor in three stages. At the first stage phenol is reacted with sulphuric acid at a temperature within the range of from 80° to 100° C. for a period of from 2 to 24 hours; at the second stage sulphonated phenol is reacted with the nitrogen-containing compound at a temperature of from 40° to 70° C. for 0.5–1.0 hour; at the third stage the resulting product is reacted with the aldehyde at a temperature within the range of from 40° to 70° C. for 0.25 hour (cf. British Pat. Nos. 1,228,857 and 1,272,857). This prior art process has disadvantages residing in its intermittent character, long duration of the technological cycle, as well as considerable labour and power consumption.

The nitrogen-containing compound incorporated in said acid agent lowers the corrosion activity of cured phenol-aldehyde resins and also behaves as an acceptor of the aldehyde evolved upon curing of the phenol-aldehyde resole.

The acid agent as used in this prior art process also has disadvantages, for example, insufficient strength and brittleness of phenol-aldehyde resins cured thereby. Furthermore, this acid agent is liable to crystallization at a low temperature which in certain cases causes substantial technological difficulties.

Consequently, all prior art process for producing an acid agent have the following basic disadvantages:
intermittent character of the process resulting in:
losses of both the starting materials and the final product;
long duration of technological cycle;
considerable power and labour consumption.

OBJECT OF THE INVENTION

It is an object of the present invention to provide a continuous process for producing an acid agent, which would have a high productivity and efficiency and enable the production of a product possessing low viscosity, low corrosion activity and not crystallizing at a lowered temperature.

SUMMARY OF THE INVENTION

The present invention resides in the provision of a process for producing an acid agent by mixing sulphonated phenol and formaldehyde and reacting the components at an elevated temperature and, when required, in the presence of processing aids, wherein, in accordance with the present invention, mixing and reacting of the components is carried out continuously in an "ideal" displacement apparatus at a constant molar ratio of the reactants and at a temperature within the range of from 50° to 120° C.

The process for producing an acid agent in accordance with the present invention is conducted according to an advanced technological scheme which provides for high productivity at lower power inputs and labour consumption as compared to the prior art processes.

The acid agent containing urea as the processing aid and produced by the process according to the present invention has an advantage residing in that it is not liable to crystallization at a lowered temperature.

DETAILED DESCRIPTION OF THE INVENTION

In accordance with the present invention, the acid agent is produced continuously at a molar ratio of sulphonated phenol to formaldehyde varied within the range of from 1:0.3 to 1:0.5 respectively. At such a molar ratio the acid agent contains substantially no free phenol, it is well compatible with water and has a viscosity of at most 120 poises at the temperature of 20° C.

The acid agent can be modified by various compounds such as an alcohol, a nitrogen-containing compound, a metal sulphonate, orthophosphoric acid and other suitable compounds which are selected depending on the properties which should be imparted to the acid agent. Therefore various embodiments of the process for producing an acid agent are possible.

One embodiment of the present invention relates to a process for the production of an acid agent, wherein for amelioration of acceptor properties with respect to the free aldehyde as the processing and use is made of urea and the ratio sulphonated phenol, formaldehyde and urea is maintained within the range of 1:(0.4–1.2):(0-.5–1.0).

This object, naturally can be accomplished by means of another nitrogen-containing compound such as thiourea or dicyanediamide; however, from the economic considerations (commercial availability and low cost) urea is preferable.

Another embodiment of the present invention relates to a process for producing an acid agent, wherein to improve fire-resistance of the product cured by the acid agent as the processing aid use is made of orthophosphoric acid in an amount of from 5 to 20% by weight. Use can be made of other flame retardants such as boric acid; however, commercial availability and low cost of orthophosphoric acid make it a preferable agent which could be used as a solvent for sulphonated phenol.

Still another embodiment of the process for producing an acid agent according to the present invention contemplates introduction of urea in the form of a liquid solution in orthophosphoric acid for the purpose of simplification of the process technology.

The residence time of the reaction mixture in the reactor should not be shorter than the time necessary to complete the exothermal reaction. Violation of this requirement results in the preparation of a non-uniform product. By selecting an appropriate temperature and the reactor dimensions, it is possible to ensure completion of the exothermal reaction within the period of residence of the reaction mixture in the reactor of from 0.5 to 10 minutes.

The principal distinctive feature of the continuous process according to the present invention over the prior art (batch) processes for producing an oligomer-acid agent resides in that said process is carried out with different starting composition of the reaction mixture which in the process of the present invention does not incorporate, at the beginning of production, of sulphonated phenol methylene derivative in contrast to the prior art process, wherein the reaction mixture is gradually enriched with a methylene derivative of sulphonated phenol as the aldehyde is carefully added to the reaction mixture. In accordance with the present invention, the process occurs at a constant molar ratio of the reagents unlike the prior art process which is performed with a variable molar ratio of the reagents. These particular features are responsible for a novel quality of the product prepared by the process according to the present invention.

Another distinction resides in that the process is substantially intensified, i.e. duration of individual stages and that of the process as a whole is considerably reduced. This makes prossible to substantially improve technological and economic characteristics of the process.

The term "phenol" as used in the description of the present invention means phenol per se and derivatives thereof, such as isomeric cresols.

As the sulphonating agent it is preferable to use concentrated sulphuric acid. However, this does not exclude the possibility of using, for example, oleum.

For the purposes of the present invention sulphonated phenol is preferable; however, in the case of urea as the processing aid use can also be made of other aryl sulphonic acids such as benzene sulphonic acid.

"Formaldehyde" is a 37% aqueous solution of formaldehyde, i.e. formalin; however, it is possible to use other aldehydes, such as acetaldehyde.

The role of "urea", i.e. an active acceptor of free formaldehyde, can be taken by other non-substituted or mono-substituted amides and amines; this, however, does not seem to be economically expedient.

For the purpose of the present invention such technological scheme of the process is preferable, wherein the reaction products having temperature above 70° C. are delivered from the main through-flow reactor into a special heat-exchanger, wherein, while cooling, they heat the starting components (phenol, sulphuric acid) to a temperature of about 50° C. In this embodiment, after mixing of the starting components the reaction mixture temperature reaches 110°–180° C. as a result of liberation of exothermal heat which makes it possible to complete the reaction of sulphonation of phenol under the conditions approaching the adiabatic ones for a period of from 0.5 to 5.0 minutes without supplying any additional heat.

In the production of an acid agent it is preferable, in some cases, to neutralize a portion of sulphonated phenol in the acid agent by means of a base with the formation of metal sulphonates. This modified embodiment of the process according to the present invention makes it possible to lower the corrosion activity of the acid agent. Furthermore, resole resins cured by this acid agent frequently have a reduced water- and humidity-absorption. As the neutralizing additive use can be made of oxides, hydroxides, carbonates, borates and the like compounds, i.e. bases and salts of weak acids of such metals as barium, calcium, copper, silver, zinc, tin, iron, and the like, which are introduced in an amount usually not exceeding 0.1 mole per 1.0 mole of sulphonated phenol.

For a better understanding of the present invention some specific Examples are given hereinbelow which are presented in the form of a table.

In all the Examples sulphonated phenol is used in the form of a melt or as a solution in orthophosphoric acid. Phenol and formaldehyde are metered in the liquid form.

The starting components, in accordance with the formulation are fed by means of metering pumps into a through-flow reactor, wherein the residence time of the reaction mixture is maintained within the range of from 0.5 to 10 minutes and the temperature, within the range of from 50° to 120° C.

Table

| | Production of an acid agent from sulphonated phenol and formaldehyde | | | | | | Viscosity at 20° C. cP vises |
|---|---|---|---|---|---|---|---|
| Example No. | Phenol mole | Sulphuric acid (94%), mole | Formal- dehyde mole | Purpose additives | | | |
| | | | | urea mole | neutralization agent, mole | orthophosphoric acid and diluents, wt. % | |
| | 1.0 | 1.0 | 0.3 | — | — | — | 2,350 |
| 2 | 1.0 | 1.0 | 0.5 | — | — | — | 11,600 |
| 3 | 1.0 | 1.0 | 0.5 | — | — | 14.2 $H_2O$ | 36,300 |
| 4 | 1.0 | 1.5 | 0.5 | — | 0.05 CuO | 9.1 Ethanediol | 3,560 |

Table-continued

| Example No. | Phenol mole | Sulphuric acid (94%), mole | Formaldehyde mole | Purpose additives | | Viscosity at 20° C. cP vises |
| | | | | urea mole | neutralization agent, mole | orthophosphoric acid and diluents, wt. % | |
|---|---|---|---|---|---|---|---|
| 5 | 1.0 | 1.5 | 0.3 | — | 0.05 $CuCO_3$ | 5.0 $H_3PO_4$ | 1,500 |
| 6 | 1.0 | 1.5 | 0.3 | — | 0.02 $Ba(OH)_2$ | 2.0 $H_3PO_4$ | 600 |
| 7 | 1.0 | 1.0 | 0.4 | — | — | 10.0 $H_3PO_4$ | 1,130 |
| 8 | 1.0 | 1.0 | 0.52 | 0.8 | 0.02 $Ag_2O$ | — | 2,790 |
| 9 | 1.0 | 1.0 | 0.49 | 0.8 | 0.05 CuO | 9.7 $H_3PO_4$ | 930 |
| 10 | 1.0 | 1.0 | 0.8 | 0.8 | 0.05 $CuCO_3$ | 8.65 $H_3PO_4$ | 855 |
| 11 | 1.0 | 1.0 | 0.4 | 1.0 | 0.02 $Ba(OH)_2$ | 7.25 $H_3PO_4$ | 1,040 |
| 12 | 1.0 | 1.0 | 1.2 | 1.0 | — | 7.7 $H_3PO_4$ | 1,830 |
| 13 | 1.0 | 1.0 | 0.5 | 0.5 | — | — | 2,240 |

What is claimed is:

1. A process for producing an acid agent which comprises intermixing sulphonated phenol and formaldehyde in a ratio of from 1:0.3 to 1:0.5 and conducting the reaction at said constant reactant molar ratio in an "ideal displacement" apparatus at a temperature of from 50° to 120° C.

2. A process as claimed in claim 1, wherein the reaction between sulphonated phenol and formaldehyde is conducted in the presence of urea and wherein the ratio of the reactants is 1:(0.4–1.2):(0.5–1.0), respectively.

3. A process as claimed in claim 2, wherein urea is employed in solution form in orthophosphoric acid.

4. A process as claimed in claim 3, wherein the orthophosphoric acid is employed in an amount ranging from 5 to 20% by weight of the mixture.